United States Patent Office 3,613,241
Patented Oct. 19, 1971

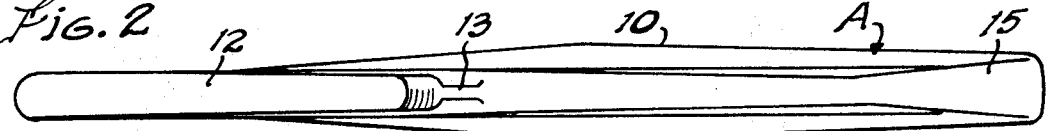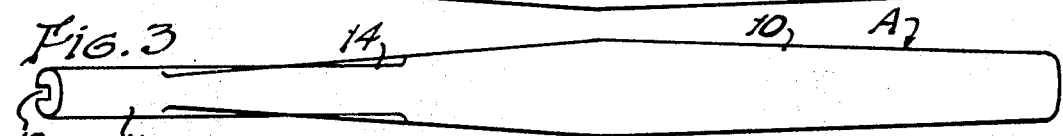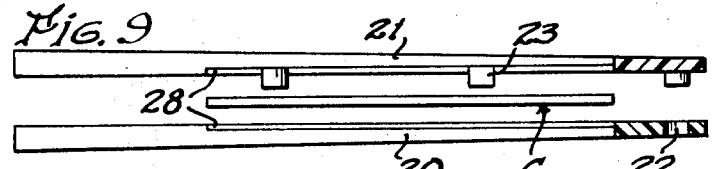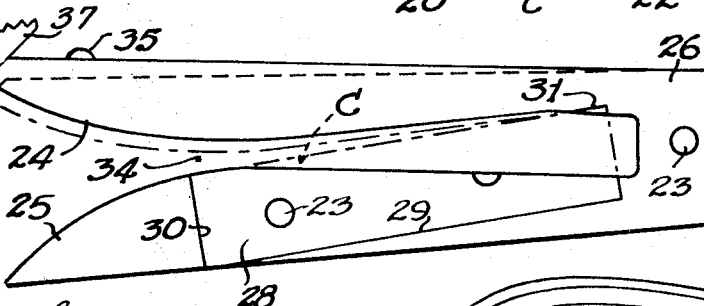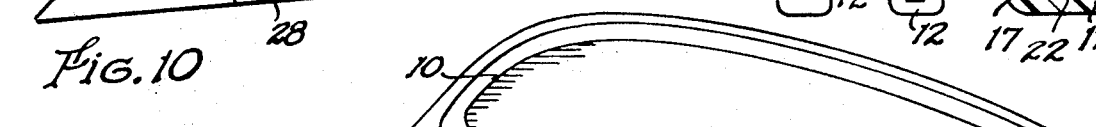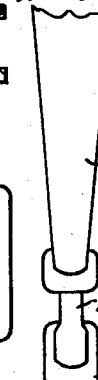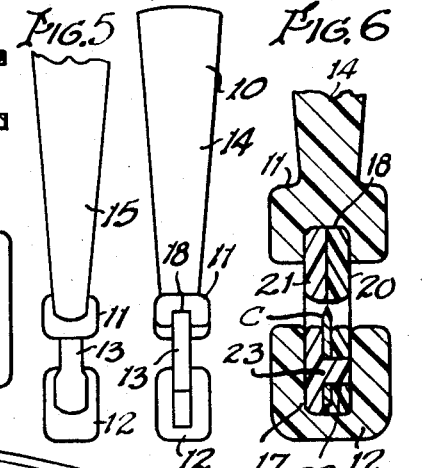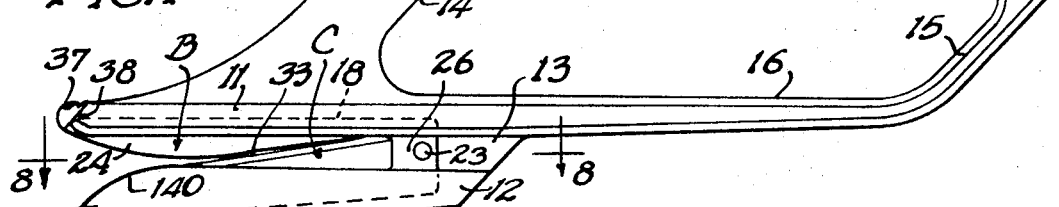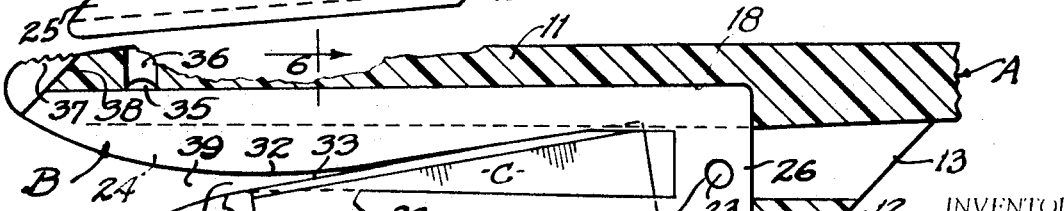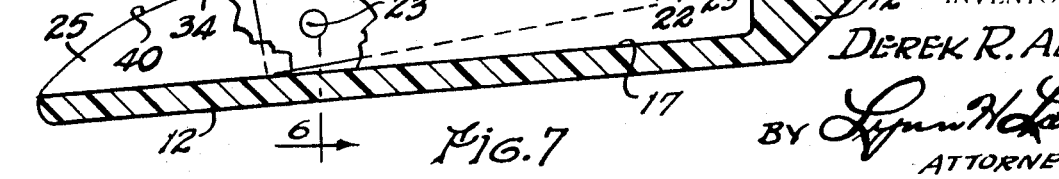

3,613,241
CUTTER FOR SOFT FIBROUS MATERIALS
Derek R. Allen, Montrose, Calif., assignor to Allen Medical Instruments Division of Bio-Dynamics Inc., Montrose, Calif.
Filed Sept. 22, 1969, Ser. No. 859,920
Int. Cl. B26b 29/00
U.S. Cl. 30—294
9 Claims

ABSTRACT OF THE DISCLOSURE

A knife for cutting surgical bandages, paper and the like, comprising a blade and an opposed feeding jaw cooperatively defining a material-receiving narrow gap in which the blade's cutting edge substantially intersects the supporting face of the jaw at a small angle in the range of 0°–10° and in which the material is severed as it is pushed through the gap.

BACKGROUND OF THE INVENTION

Surgical bandage cutters embodying a pair of knife blades set in a holder in flat face-to-face contact and with their cutting edges in opposed relation and subtending an angle of more than 15°, are available commercially. Such a cutter is disclosed in U.S. Pat. No. 3,365,798. Paper cutters of a type in which a knife with slicing edge subtending an angle of more than 15° with an opposed feeding jaw are also known and in use. All have the disadvantage of the fabric catching or clogging in the apex of the gap where the cutting edge meets the feeding jaw or another cutting edge, as in Pats. 2,805,476, 3,028,670 and 3,365,798.

OBJECTS OF THE INVENTION

A principal object of this invention is to provide an improved cutter of the general type outlined above, in which the tendency of the material to clog as it is fed into the apex of the cutting gap, is minimized.

Another object is to provide such a cutter, embodied in a handle frame and a disposable blade unit (blade and blade holder) removably mounted in the handle frame, whereby a new blade unit can be expeditiously substituted for a used blade unit between cutting operations.

These and other objects will become apparent in the ensuing specifications and appended drawings, wherein:

FIG. 1 is a side view of a surgical dressing cutter embodying the invention;

FIG. 2 is a bottom view thereof;

FIG. 3 is a top view thereof;

FIG. 4 is a frontal elevational view of the same;

FIG. 5 is a fragmentary rear elevational view;

FIG. 6 is a fragmentary vertical transverse sectional view thereof, taken on line 6—6 of FIG. 7;

FIG. 7 is a side view of the blade holder and blade as assembled in the handle frame, which is fragmentarily shown in section; a portion of the blade holder being broken away;

FIG. 8 is a horizontal sectional view of the blade holder assembly, taken on line 8—8 of FIG. 1;

FIG. 9 is an exploded longitudinal horizontal section view of said assembly; and FIG. 10 is an inner side view of one of the holder sections, with the blade shown in phantom.

DESCRIPTION

Referring now to the drawing in detail, I have shown therein, as an example of one form in which the invention may be embodied, a bandage cutter comprising, in general, a handle unit A, a blade holder B removably mounted therein, and a blade C permanently fixed in the holder B and adapted to be discarded by removal of holder B from handle unit A and replaced by a fresh, sharp, sterile blade and holder assembly.

Handle unit A may be of cast metal (e.g. aluminum) or, e.g., in a simplified, less expensive (e.g. disposable) form, of stiff, hard or substantially unplasticized character.

Handle unit A of FIGS. 1–7 comprises a handle proper 10; a holder frame comprising upper and lower spaced jaws 11 and 12 and a bridging web 13 connecting the rear end of lower jaw 12 to upper jaw 11; and an intermediate body of open elongated ring form including front and rear arms 14 and 15 extending downwardly from handle 10, arm 14 merging with upper jaw 11 and arm 15 joined to a bar 16 formed as a rearward extension of jaw 11.

Lower jaw 12 is of channel section, defining an upwardly opening holder-mounting longitudinal slot 17 receiving the bottom of blade-holder B. Jaw 12 has a flat, smooth lower face, and functions as a shoe for sliding along the skin of a patient, during a bandage-slitting operation.

Upper jaw 11 has in its under surface a slot 18 to receive the upper edge of holder B. With the blade holder engaged in slots 17 and 18 for its entire length, there is provided a mounting which holds the unit B securely in the vertical longitudinal median plane of the handle unit A.

Holder B is sectional, composed of right and left sections 20 and 21 having adjoining faces located in the median vertical longitudinal plane of handle unit A when installed therein, and having dowel sockets 22 on section 20 and integral dowels 23 on section 21 which are secured in the sockets 22 for joining them in registering face-to-face assembly, the sections being substantially mirror-image mates. Holder B is in the form of a fork, comprising upper and lower arms 24 and 25 and a connecting bridge 26, all embodying respective right and left sections. The upper margin of upper arm 24 and the lower margin of lower arm 25 are spaced so as to snugly engage the lower face of upper handle jaw 11 and the bottom of slot 17 in lower jaw 12, preferably with a yielding pressure engagement provided for by somewhat greater normal spacing (full-line position of FIG. 10) between the fork margins than between the holder sockets of jaws 11, 12, when the holder B is separated from the handle A. When installed, the arms 24, 25 are compressed to close positions as indicated in phantom in FIG. 10 and in full lines in FIG. 1. The holder sections are provided, in the inner faces of their lower arms, with shallow face recesses 28 of triangular area (FIG. 10) each having a bottom shoulder 29 inclined from a forward end shoulder 30, upwardly and rearwardly from the lower to the upper margin of such lower arm; and the upper arms have small notches 31 opposite the rear end of inclined bottom shoulder 29; whereby a blade C, secured between the holder sections 20, 21 and positioned in the recess 28 with its back edge located against bottom shoulder 29 and its forward end located against forward end shoulder 30, will be secured by engagement of its upper rear corner in notch 31, in a position in which its cutting edge 33 will extend diagonally across the throat 34 defined between arms 24 and 25. Holder sections 20 and 21 are secured together by any suitable means, e.g. by a cemented bond between adjoining faces, with blade 32 sandwiched between them and with dowels 23 extending through suitably located perforations in blade 32. Near the forward end of upper arm 24 is a locating lug 35 (FIG. 7) which is receivable in a keeper recess (e.g. bored hole) 36 in upper handle jaw 11, whereby the holder B, with its arms 24, 25 pressing outwardly against handle jaws 11 and 12, will be securely latched into the handle unit. At the forward tip of upper holder arm 24 is a thumb grip 37 in the form of a hook adapted to overhang a bevelled nose 38 on the forward end of upper handle jaw 11 in a manner to lock the upper arm 24 to the upper handle jaw 11, so that considerable thumb pressure must be applied downwardly against grip 37 in order to spring the arm 24 free of the jaw 11.

Upper holder arm 24 has a feed surface 32 opposed to blade edge 33 and converging rearwardly with respect to the rear portion of the length of the edge 33 at an angle in the range of 0° up to 10° maximum and an optimum of between 1° and 4°. Feed surface 32 is substantially straight from the rear end of blade edge 33 to approximately midway of the length of edge 33; and is convexly curved away from edge 33 from this mid point forwardly, so as to provide a flaring mouth 39 between the edge 33 and feed surface 38 at the forward end of the blade.

The mouth 39 functions to gather the material of a bandage from a loose to a compressed condition such as to press the cutting edge 33 into the material with a slicing action as the cutter is moved forwardly against an edge of the material that has been inserted into the throat 34.

Lower arm 25 and lower jaw 12 have matching forward end portions defined by convexly curved ramp surfaces 40 and 140 which intersect substantially straight bottom margins to define a pointed forward end 41 adapted to be inserted beneath a bandage with the bottom surface of jaw 12 sliding against a patient's skin. The ramp surfaces 40, 140 then function to lift the bandage into throat 34 as the cutter is advanced against the edge of the bandage.

Blade holder B is of tapered thickness from its front to its rear end. Hence, the drag of the bandage against the holder will wedge it tightly in mounting slots 17 and 18 of jaws 12 and 11 respectively. Also, this tapered thickness reduces the drag of the cut edges of the bandage against the rearward surfaces of the holder. Handle web 13 is of no greater thickness than the rear end of holder B, so as to pass smoothly between the cut edges of the bandage.

I claim:
1. A cutter for fibrous material comprising:
a holder embodying a pair of opposed, spaced arms defining a throat;
a blade secured to one of said arms, said blade having a cutting edge extending diagonally across said throat to a point of intersection with the other arm near the rear extremity thereof;
said other arm having a feed surface in opposed relation to said cutting edge and subtending therewith an angle in the range of 0° to 10° over the rearward portion of the length of said cutting edge; and
a handle having opposed jaws provided with respective longitudinal slots for releasably mounting said holder therebetween.

2. A cutter as defined in claim 1, wherein the angle of divergence of said cutting edge from said feed surface lies in said range of 0° to 10° for at least half the length of said cutting edge.

3. A cutter as defined in claim 2, wherein said feed surface has a portion of convex curvature opposed to said cutting edge along the forward portion of its length and defining therewith a mouth of increasingly flaring divergence toward the forward end of said other arm.

4. A cutter as defined in claim 1, wherein said angle of divergence is in an optimum range of 1°–4°.

5. A cutter as defined in claim 1,
said holder including means resiliently loading said arms for yielding pressure engagement with said jaws; and
said handle slots and holder being tapered from maximum transverse dimensions at their rear ends to minimum dimensions at their forward ends.

6. A cutter as defined in claim 1:
said holder including means resiliently loading said arms for yielding pressure engagement with said arms.

7. A cutter as defined in claim 6:
said holder being in the form of a fork including a back bridge integrally connecting said arms in a greater spacing between the outer margins of said arms, when free, than the spacing between said jaws, said resilient loading being derived from resiliency in said arms tending to spring apart when confined between said jaws.

8. A cutter as defined in claim 7:
one of said arms and its corresponding handle jaw having a latch projection and a complementary latch recess receiving said projection, for latching said holder to said handle in response to said resilient loading.

9. A cutter as defined in claim 1:
said holder comprising a pair of separable sections, each in the form of a fork including a pair of arm sections and a back bridge integrally connecting said sections, said holder sections including means for releasably positioning them in face-to-face registration with said blade releasably sandwiched between them, said sections being held together by engagement in the slots of said jaws.

References Cited

UNITED STATES PATENTS

| 1,137,445 | 4/1915 | Allais | 30—317 |
| 2,603,866 | 7/1952 | Rice | 30—294 |
| 3,028,670 | 4/1962 | Tilly | 30—294 |

FOREIGN PATENTS

| 24,131 | 10/1883 | Germany | 30—294 |
| 596,373 | 1/1948 | Great Britain | 30—294 |

ROBERT C. RIORDON, Primary Examiner

J. C. PETERS, Assistant Examiner

U.S. Cl. X.R.

30—335